T. J. BARRETT.
DISTANCE AND SPEED INDICATOR AND RECORDER.
APPLICATION FILED APR. 12, 1915.

1,213,801.

Patented Jan. 23, 1917.
3 SHEETS—SHEET 1.

INVENTOR
Thomas J. Barrett,
BY
ATTORNEYS.

T. J. BARRETT.
DISTANCE AND SPEED INDICATOR AND RECORDER.
APPLICATION FILED APR. 12, 1915.

1,213,801.

Patented Jan. 23, 1917.
3 SHEETS—SHEET 3.

INVENTOR
Thomas J. Barrett,
BY
ATTORNEYS.

UNITED STATES PATENT OFFICE.

THOMAS J. BARRETT, OF IRVINGTON, NEW JERSEY, ASSIGNOR, BY MESNE ASSIGNMENTS, TO AUTOGRAPHIC RECORDER COMPANY, OF NEWARK, NEW JERSEY, A CORPORATION OF NEW JERSEY.

DISTANCE AND SPEED INDICATOR AND RECORDER.

1,213,801.  Specification of Letters Patent.  Patented Jan. 23, 1917.

Application filed April 12, 1915.  Serial No. 20,679.

*To all whom it may concern:*

Be it known that I, THOMAS J. BARRETT, a British subject, residing at Irvington, county of Essex, State of New Jersey, have invented certain new and useful Improvements in Distance and Speed Indicators and Recorders; and I do hereby declare the following to be a full, clear, and exact description of the invention, such as will enable others skilled in the art to which it appertains to make and use the same.

This invention relates to instruments for use in indicating and recording the distance and speed of travel of a vehicle such as a locomotive or an automobile. An instrument of this character is shown in Patent No. 949,000 granted to G. S. Maxwell, February 15, 1910, and the present invention involves the provision of various improvements adapted for use in an instrument of the general character shown in that patent.

The object of the invention is to provide a novel construction and arrangement of the parts of an instrument of this character whereby more smooth, efficient and reliable operation is obtained, whereby lost motion is eliminated to a large degree, whereby the number of parts employed is greatly reduced, and whereby a material saving is effected in the cost of manufacture.

I have illustrated the preferred embodiment of the invention in the accompanying drawings, in which—

Figure 1:
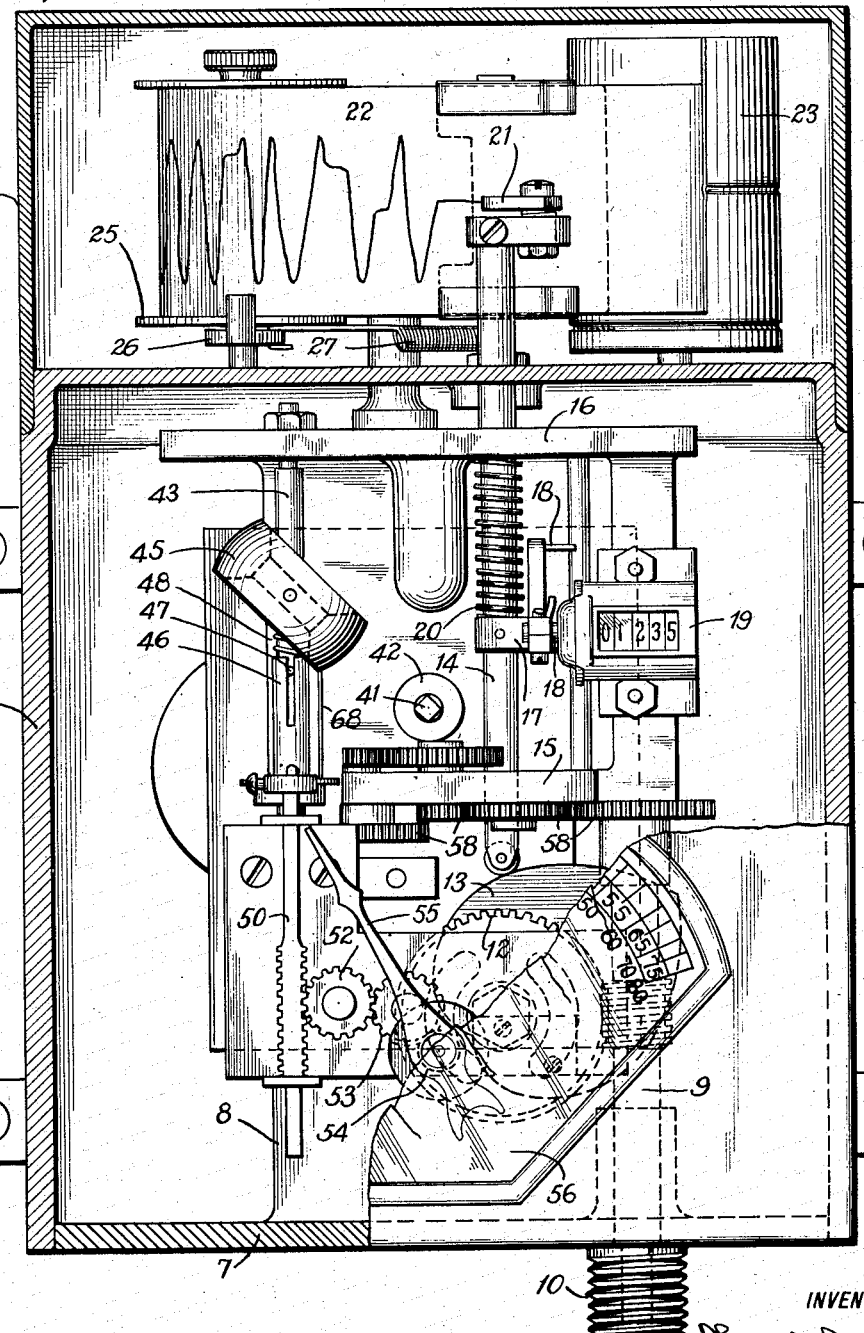
Figure 2:
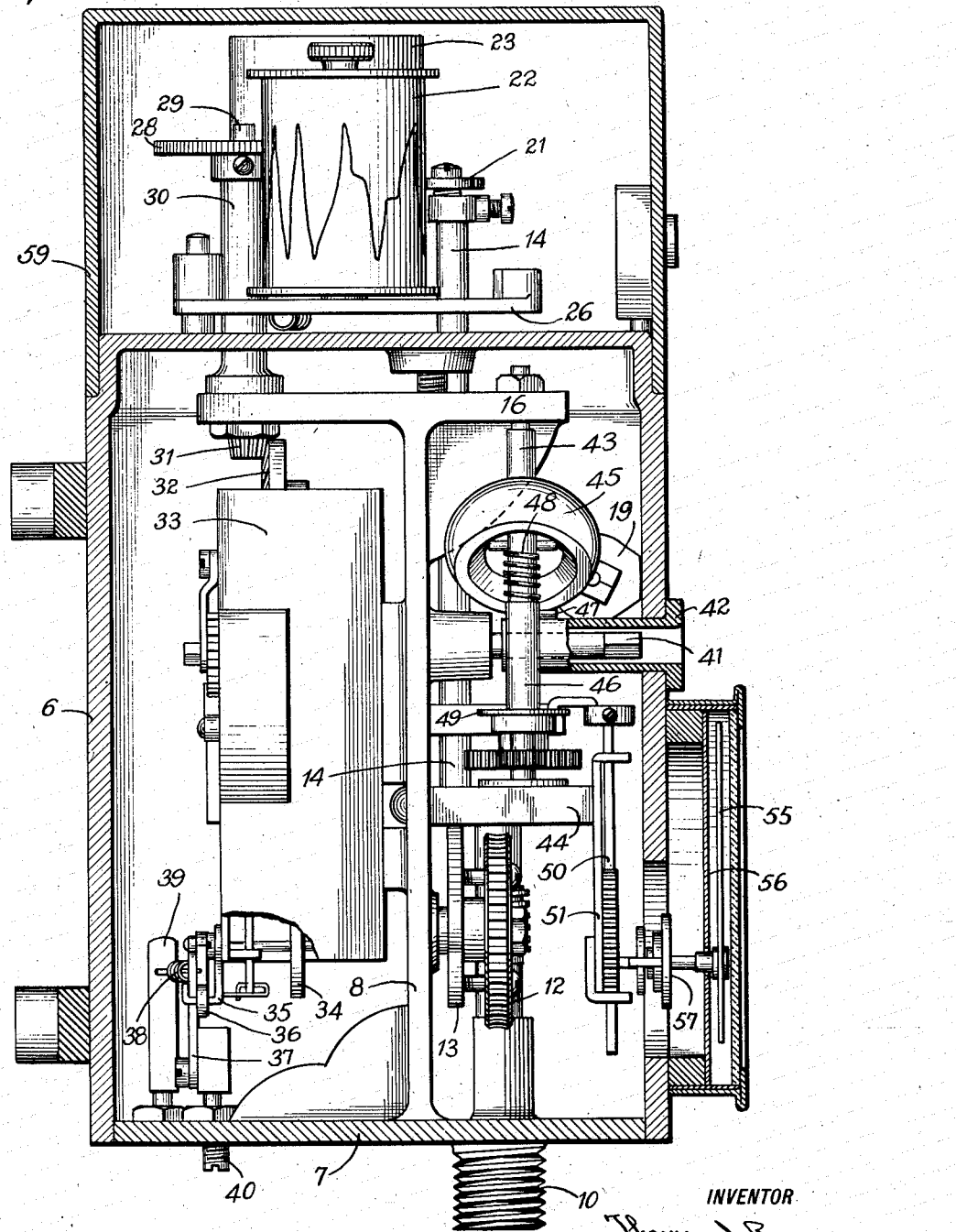
Figure 3:
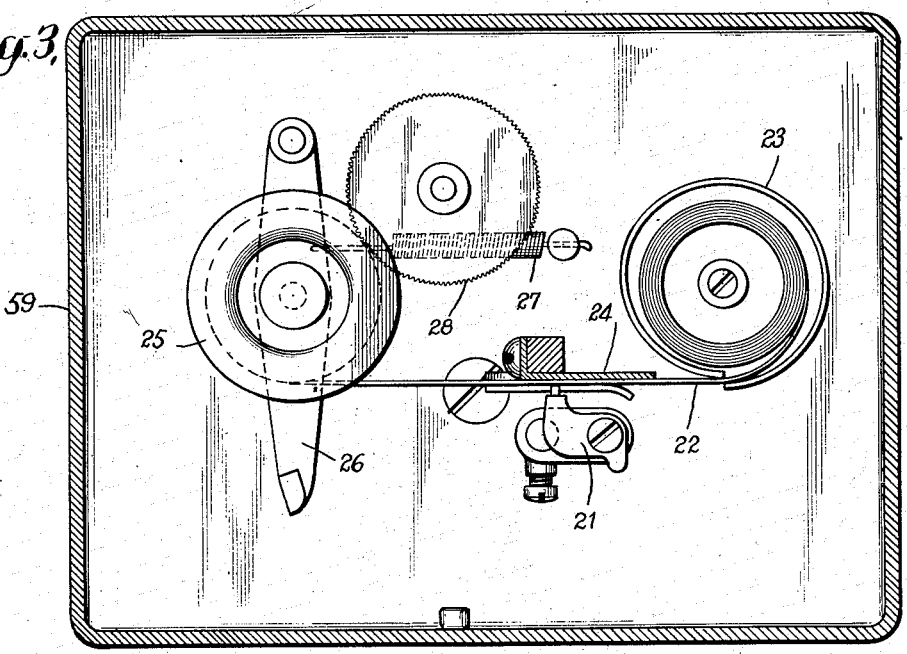
Figure 4:
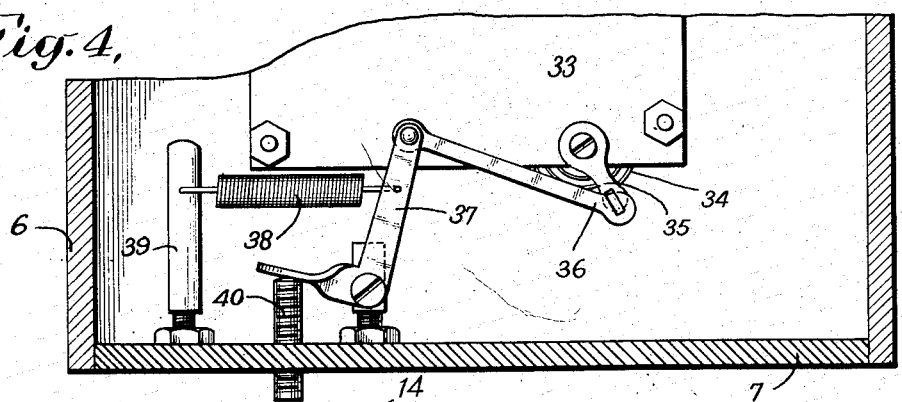
Figure 5:
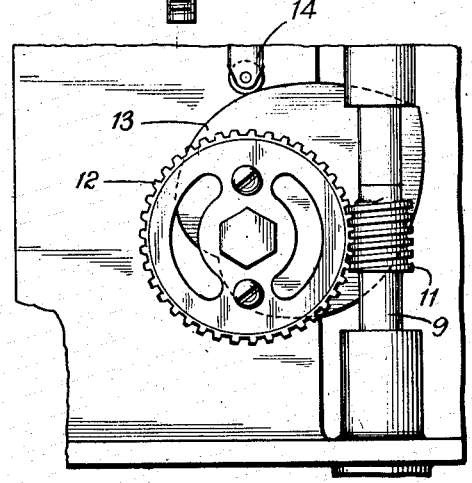

Figure 1 is a front view of the instrument broken away in part; Fig. 2 is a vertical section of the instrument; Fig. 3 is a horizontal section showing the tape supporting and feeding devices; Fig. 4 is a detail view illustrating the means for regulating the clock mechanism; and Fig. 5 is a detail view of the mechanism employed for reciprocating the marking device.

Referring to these drawings, the instrument is inclosed within a rectangular casing 6 having a removable base-plate 7 upon which most of the operating mechanism is mounted. A supporting structure 8 is cast integral with the plate 7 and in this structure is a bearing for a rotary shaft 9. This shaft is adapted to be driven from an external source, such for instance, as the wheel of a vehicle, and the base-plate 7 is provided with a boss 10 through which connection is made to the shaft 9 and which is threaded to receive the coupling of a suitable inclosing conduit.

On the shaft 9 is the worm 11 meshing with a worm wheel 12 mounted for rotation on a stub shaft projecting from the support 8. This shaft also carries a heart-shaped cam 13 adapted to actuate a reciprocating rod 14 which is supported in bearings formed in shelves 15 and 16 cast integral with or secured to the support 8. The rod 14 carries a roller at its lower end adapted to travel upon the periphery of the cam 13. Secured on the rod 14 is an arm 17 to which pins 18 are affixed. These pins lie on opposite sides of the operating arm of a counter 19 so that as the rod 14 is moved up and down, the pins 18 operate the counter once for each reciprocatory movement of the rod 14, that is, once for each revolution of the cam 13. Between the arm 17 and the shelf 16 is a spring 20 coiled upon the rod 14, this spring serving to move the rod 14 downwardly and hold its lower end in contact with the periphery of cam 13.

The upper end of rod 14 extends through an opening in the casing 6 and on its upper end this rod carries a marker 21 of any suitable construction adapted to mark upon a suitable tape 22. This tape is supplied from a receptacle 23 (Fig. 3) and passes over a supporting surface 24 which supports the tape at the point where the marks are made by the marker 21. The tape is wound upon a roller 25 which is carried by an arm 26 pivotally mounted upon the top of the casing 6 and adapted to be turned upon its pivot by a coil spring 27. The tape is fed by a disk 28 whose edge is knurled as shown. The periphery of this disk engages the paper wound upon the roll 25, the roll being held in engagement with the disk by the spring 27. The paper-feeding disk 28 is mounted upon the upper end of a shaft 29 which passes through a cylindrical holder 30 mounted on the top of the casing 6 and down into the casing; at its lower end it carries a gear 31 which meshes with a crown gear 32 carried by one of the shafts of a clock mechanism 33 which is secured to the rear face of the support 8. It will thus be seen that the paper tape is fed from the supply 23 to the take-up 25 at a predetermined and uniform speed by the clock mechanism 33.

Means are provided for regulating the clock mechanism from outside the casing of the instrument so that accuracy and uniformity of operation may be secured and particularly so that uniform lengths of the paper tape, such as lengths indicated by marks on the tape, will pass the marker in a given unit of time. This regulating mechanism is shown in Figs. 2 and 4. In Fig. 4 the hair spring of the clock mechanism is shown at 34 and the arm coöperating therewith at 35. This arm is pivotally mounted upon the frame of the clock mechanism and at its end is connected to one end of a link 36 whose opposite end is connected to a bell-crank lever 37. This lever is pivotally mounted upon the inner side of the base-plate 7 and is turned in one direction upon its pivot by a coil spring 38 connected at one end to the lever 37 and at the other end to a stud 29. The bell-crank lever 37 is turned in the opposite direction by a screw 40 which is threaded into an opening in the base-plate 7. Thus, by turning the screw 40 from outside the casing of the instrument, the parts 37, 36 and 35 may be adjusted as may be necessary in order to secure the desired regulation of the clock mechanism which effects the feed of the tape.

The clock mechanism 33 may be rewound by applying a key to the squared end of the shaft 41 (Fig. 2) of the main spring. This end of the shaft extends into a sleeve 42 mounted in an opening in the front wall of the casing 6.

In addition to the two vertical shafts 9 and 14, there is a third shaft 43 mounted parallel to the shafts 9 and 14 and adapted to rotate in bearings formed in the shelf 16 and in a shelf 44 projecting forwardly from the support 8. This shaft 43 has a centrifugal member 45 pivotally mounted thereon, this member being preferably in the form of a ring. Shaft 43 also carries a sleeve 46 slotted to receive a pin 47 on the shaft so that the sleeve will rotate with the shaft. This sleeve is normally pressed downwardly by a spring 48 coiled on the shaft 43 but it may be raised against the tension of the spring by turning movement of the centrifugal member 45. For this purpose the member 45 is connected by a rod 68 to a disk 49 secured to the lower end of the sleeve 46. The disk 49 coacts with the upper bent end of a reciprocating rack 50 mounted for vertical movement in a holder 51. The teeth of this rack mesh with a gear 52 and an intermediate gear 53 connects the gear 52 with a gear 54 on the shaft of an index 55. The shaft of this index extends through an opening in the front wall of the casing 6 and the index is adapted to move over a suitable scale 56 covered by glass and marked off with spaces appropriately designated, as for instance, in miles per hour. A spring 57 is connected at one end to the shaft of the index 55 and at the other end to an adjacent portion of the casing; this spring serves to retract the index 55 to the zero position and also acts through the gearing above described to move the rack 50 downwardly and hold its upper bent end in engagement with the disk 49 of the sleeve 46.

The shaft 43 is driven from the shaft 9 but the connection between these two shafts is made through speed multiplying gearing so that the shaft 43 is rotated at a speed greatly in excess of that of the shaft 9. For this purpose, a train of gears 58 is shown mounted upon the shelf 15 and serving to transmit the rotary motion of shaft 9 to the shaft 43.

This being the construction of the instrument, the operation thereof will be readily understood. The shaft 9 is driven from the wheel of the vehicle and serves to rotate the cam 13 through the gears 11 and 12. The cam thus rotated reciprocates the rod 14 and thus causes actuation of the counter 19 to register the total distance of travel of the vehicle. Also, as the rod 14 is reciprocated, the marker 21 thereon is moved up and down across the traveling tape 22 and draws a curve on the tape as shown in Fig. 1. The shape of the curve so drawn and the distance between successive undulations of the curve indicate the speed of travel of the vehicle and the tape therefore serves as a permanent record of the speed. Also, when the shaft 9 is rotated, the shaft 43 is rotated simultaneously but at higher speed and as its speed varies the angular position of the centrifugal member 45 varies accordingly. Such angular movement of the member 45 causes movement of the index 55 over its scale 56 so that not only is a record made of the speed of travel of the vehicle but also the index 55 indicates the exact speed by reference to the scale at any time. Thus, a reading may be taken at any time of the speed of travel of the vehicle at that time and the total distance traveled and at the end of the trip a permanent record is had of the speed and distance of travel of the vehicle. It is contemplated that the mechanism for making the permanent record of the speed and distance traveled shall be inclosed within a suitable cover to which access may be had only by authorized persons. For this purpose, a cover 59 is provided adapted to inclose the marker and the tape supporting and feeding mechanism. This cover 59 fits down upon the top of the casing 6 and may be locked thereto by a suitable key.

What I claim is:

1. The combination of a casing, a rotary shaft entering the casing and adapted to be driven from an external source, a cam mounted within the casing and driven by the shaft, a rod reciprocated by the cam and having one end extending through a wall of the casing, a counter within the casing actuated by said rod, a centrifugal speed-indicator within the casing driven by said shaft, an index actuated by the indicator, a clock mechanism within the casing, a tape-feeding device exterior to the casing actuated by the clock mechanism, a marker mounted on the end of said rod extending through the wall of the casing and arranged to mark the tape fed by said device, a cover mounted on the casing in position to inclose said marker and the tape-feeding device and a regulating device for the clock mechanism operable from outside the casing; substantially as described.

2. The combination of a casing, a shaft entering the same and adapted to be driven from an external source, a transverse shaft within the casing, worm gearing connecting said shafts, a cam on the transverse shaft, a spring actuated rod reciprocated axially by the cam and its spring, a marker carried by the rod, means for supporting and feeding a tape in coöperative relation to the marker, a counter within the casing actuated by the rod, a third shaft mounted for rotation within the casing, spur gearing connecting the third shaft to the first shaft whereby the third shaft is driven by the first one at higher speed than the first one, a centrifugal member driven by the third shaft, and an index actuated by the centrifugal member; substantially as described.

In testimony whereof I affix my signature, in presence of two witnesses.

THOMAS J. BARRETT.

Witnesses:
JOHN C. PENNIE,
WARREN D. HOUSE.